US006366834B1

(12) United States Patent
Hayes et al.

(10) Patent No.: US 6,366,834 B1
(45) Date of Patent: Apr. 2, 2002

(54) TIME DISPLAY METHOD AND APPARATUS

(75) Inventors: David Hayes, Los Angeles; John Mitchell, Torrance, both of CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/589,835

(22) Filed: Jun. 8, 2000

(51) Int. Cl.[7] .................................................. G05D 1/00

(52) U.S. Cl. ........................... 701/1; 701/200; 701/211; 340/988; 368/14; 368/21

(58) Field of Search ............................ 701/1, 200, 201, 701/211, 25, 26; 340/988, 990, 995; 368/10, 14, 21, 22, 23

(56) References Cited

U.S. PATENT DOCUMENTS 5,724,316 A * 3/1998 Brunts ......................... 368/10
5,842,146 A 11/1998 Shishido ..................... 701/210

* cited by examiner

*Primary Examiner*—Yonel Beaulieu
(74) *Attorney, Agent, or Firm*—Brinks Hofer Gilson & Lione

(57) ABSTRACT

A difference in time from a standard time for each state, or where a state belongs to a plurality of time zones, a difference in time for each time zone and boundary information for specifying a state portion belonging to each time zone, are stored. In operation, a state in which a vehicle is present is detected, a check is made to determine whether the state in which the vehicle is present belongs to only one time zone by referring to the stored information, and if the state belongs to only one time zone, a time display is provided on the basis of the difference in time corresponding to that time zone. However, if the state in which the vehicle is present belongs to two time zones, a state portion where the vehicle is present is obtained on the basis of the boundary information and the vehicle's present position, and a time display is provided on the basis of the difference in time corresponding to the time zone associated with said state portion.

13 Claims, 10 Drawing Sheets

FIG. 4

TIME CONTROL DATA BASE

| NAME OF STATE | NUMBER OF TIME ZONES | DIFFERENCE FROM GREENWICH STANDARD TIME | BLOCK LONGITUDE/ LATITUDE | PRESENCE OR ABSENCE OF DAYLIGHT SAVING | SUMMER TIME DIFFERENCE / WINTER TIME DIFFERENCE |
|---|---|---|---|---|---|
| CALIFORNIA | 1 | -8 | - | ABSENCE | - / - |
| NORTH DAKOTA | 2 | -7 / -6 | P1 (LAT1, LONG1) / P2 (LAT2, LONG2) | ABSENCE | - / - |
| ARIZONA | 1 | -7 | - | PRESENCE | -8 / -7 |
| OREGON | 2 | -8 / -7 | P1' (LAT1', LONG1') / P2' (LAT2', LONG2') | ABSENCE | - / - |
| ⋮ | ⋮ | ⋮ | ⋮ | ⋮ | ⋮ |

TIME DISPLAY METHOD AND APPARATUS

BACKGROUND OF THE INVENTION

The present invention relates to a time display method and a time display apparatus for use in a continent where a plurality of time zones which are different in delay time (a difference in time) from the standard time are present.

In a continent such as North America, a plurality of time zones which are different in delay time from the Greenwich standard time are present. FIG. 10 is an explanatory view of time zones in the U.S.A. mainland, where four time zones are present. A first time zone is a time zone (Eastern) with a 5-hour delay from the standard time, which is an Eastern zone on the right side of a boundary line connecting AA'. A second time zone is a time zone (Central) with a 6-hour delay from the standard time, which is a Central zone surrounded by a boundary line connecting BB' and the boundary line connecting AA'. A third time zone is a time zone (Mountain) with a 7-hour delay from the standard time, which is a Mountain zone surrounded by a boundary line connecting CC' and the boundary line connecting BB'. A fourth time zone is a time zone (Pacific) with an 8-hour delay from the standard time, which is a Pacific zone on the left side of the boundary line connecting CC'.

When a plurality of time zones are present as described above, every time a train or a long-distance truck crosses these time zones and moves into a new time zone, a time display must be corrected on the basis of the new time zone. For example, in the conventional navigation apparatus mounted on the vehicle provided with a time display function, a user suitably sets an applicable time zone (Eastern, Central, Mountain, or Pacific) manually, and the navigation apparatus calculates the present time on the basis of a difference in time in the time zone set to display it. However, the operation for setting a time zone every time poses a cumbersome problem. Because of this, U.S. Pat. No. 5,842,146 proposes a method for automatically discriminating a time zone to which a vehicle belongs and calculating the present time on the basis of a difference in time in the time zone to display it. That is, the proposed method is to find the present position (longitude and latitude) of a GPS (Global Positioning System) vehicle, and find the time zone where the vehicle is present from the vehicle's present position and geographical information of the time zone. However, since it is necessary to geographically accurately specify the boundary lines AA', BB', and CC' of the time zones in FIG. 10, the proposed method has the problem that a large quantity of memory is required, and in addition considerable processing is necessary to discriminate the appropriate time zone. Therefore, a method is contemplated in which a boundary line of a time zone is approximated by a single straight line, but an error occurs in the time display in the vicinity of the boundary line.

SUMMARY OF THE INVENTION

From the foregoing, it is an object of the present invention to provide a time display method and apparatus without the necessity of geographically specifying the boundary lines AA', BB', and CC' of the time zones.

It is a further object of the present invention to provide a time display method and apparatus capable of displaying time taking a time zone and daylight saving into consideration by simple processing.

According to the present invention, the aforementioned object is achieved by a time display method comprising: (1) storing the delay time from the standard time for every state, or if a state belongs to a plurality of time zones, storing the delay time of each time zone for the state and boundary information for specifying a region belonging to each time zone; (2) monitoring the present position of a vehicle and detecting the state in which the vehicle is present; (3) referring to the stored information, and if the state in which the vehicle is present belongs to only one time zone, performing a time display on the basis of the delay time corresponding to the time zone; and (4) if the state in which the vehicle is present belongs to a plurality of time zones, finding a region in which the vehicle is present on the basis of said boundary information and the present position of the vehicle, and performing a time display on the basis of the delay time corresponding to the time zone to which the region belongs.

Further, according to the present invention, the aforementioned object is achieved by a time display method comprising: (1) storing information on whether or not daylight saving is enforced in every state; (2) discriminating whether or not a state in which a vehicle is present is a state where daylight saving is enforced by referring to the stored information; (3) if the state is a state where daylight saving is not enforced, performing a time display on the basis of the delay time corresponding to the time zone of the state; and (4) if the state is a state where the daylight saving is enforced, judging whether the time display is performed on the basis of either summer time or winter time, and performing the time display on the basis of the delay time from the standard time in summer time or winter time of the state.

Further, according to the present invention, the aforementioned object is achieved by a time display apparatus comprising: (1) a difference in time information storing means for storing the delay time from the standard time for every state, or if a state belongs to a plurality of time zones, storing the delay time of each time zone for the state and boundary information for specifying a region belonging to each time zone; (2) a vehicle position monitoring means for monitoring the present position of a vehicle; (3) a vehicle presence state detecting means for detecting a state in which the vehicle is present; (4) a present time calculating means for calculating, if the state in which the vehicle is present belongs to only one time zone by referring to said stored information, the present time on the basis of the delay time corresponding to the time zone; and calculating, if the state in which the vehicle is present belongs to a plurality of time zones, the present time on the basis of the delay time corresponding to the time zone to which a region in which the vehicle is present belongs; and (5) a display for displaying the calculated present time.

Further, according to the present invention, the aforementioned object is achieved by a time display apparatus, wherein (1) said difference in time information storing means stores information on whether or not daylight saving is enforced for every state, and (2) said present time calculating means calculates, by referring to the stored information and if the state in which the vehicle is present is a state where daylight saving is not enforced, the present time on the basis of the delay time corresponding to the time zone of the region, and calculates, if the state in which the vehicle is present is a state where daylight saving is enforced, the present time on the basis of the delay time from the standard time in summer time or winter time.

Other features and advantages of the present invention will be apparent from the following description taken in conjunction with the accompanying drawings.

BRIEF DESCRIPTION OF THE DRAWINGS

FIG. 4 is a table illustrating a difference in time information data base.

DESCRIPTION OF THE PREFERRED EMBODIMENTS

Figure 1:
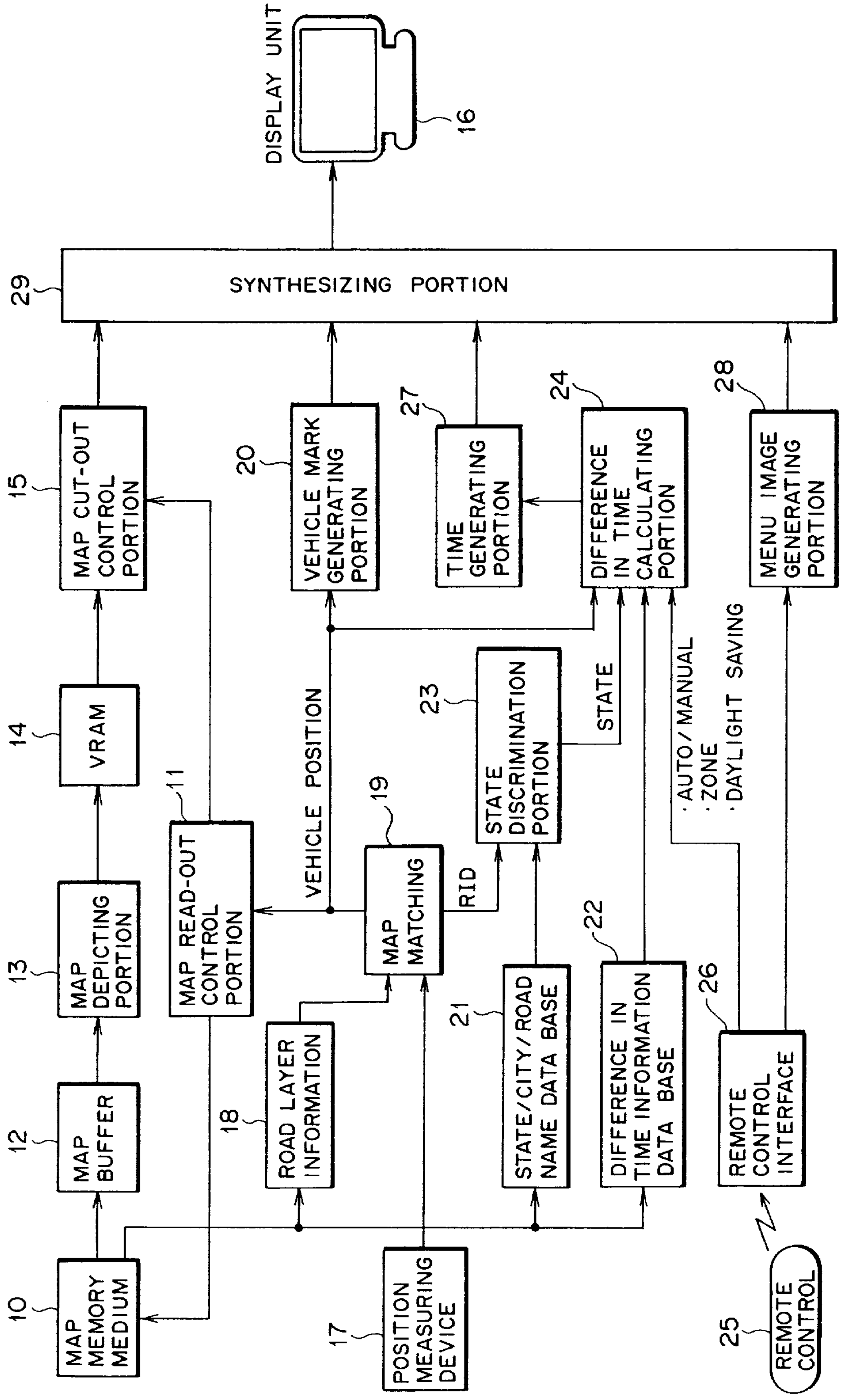
FIG. 1 is a block diagram of a navigation apparatus mounted on a vehicle provided with a time display function.

FIG. 1 is a block diagram of a navigation apparatus mounted on a vehicle provided with a time display function.

Reference numeral 10 designates a map memory medium such as CD-ROM or DVD for storing map data; 11 a map read-out control portion for reading out fixed map data from the map memory medium 10 on the basis of a vehicle position or the like, and computing a screen center position on the map displayed on the display screen according to the vehicle position; 12 a map buffer for storing the map data read out of the map memory medium; 13 a map depicting portion which generates a map image using the map information stored in the map buffer; 14 a VRAM for storing the map image; and 15 a map cut-out control portion for cutting out a map image for one screen portion from the VRAM 14 on the basis of the screen center position input from the map read-out control portion 11. Reference numeral 16 designates a display unit; and 17 a position measuring device for measuring the position of the vehicle, comprising a vehicle speed sensor for detecting a moving distance, a gyro for detecting a moving direction, a position computing CPU, a GPS receiver and so on. Reference numeral 18 designates a road layer information memory for storing road layer information from the map information read out of the map memory medium 10; and 19 a map matching portion, which (a) performs map matching processing every fixed running distance (for example, 10 m) using the road layer information, the vehicle position and the vehicle direction, (b) corrects a vehicle position on the running road, and (c) outputs a vehicle position (longitude and latitude) after correction, and a road ID (RID) of a road link on which a vehicle is present.

Figure 2:
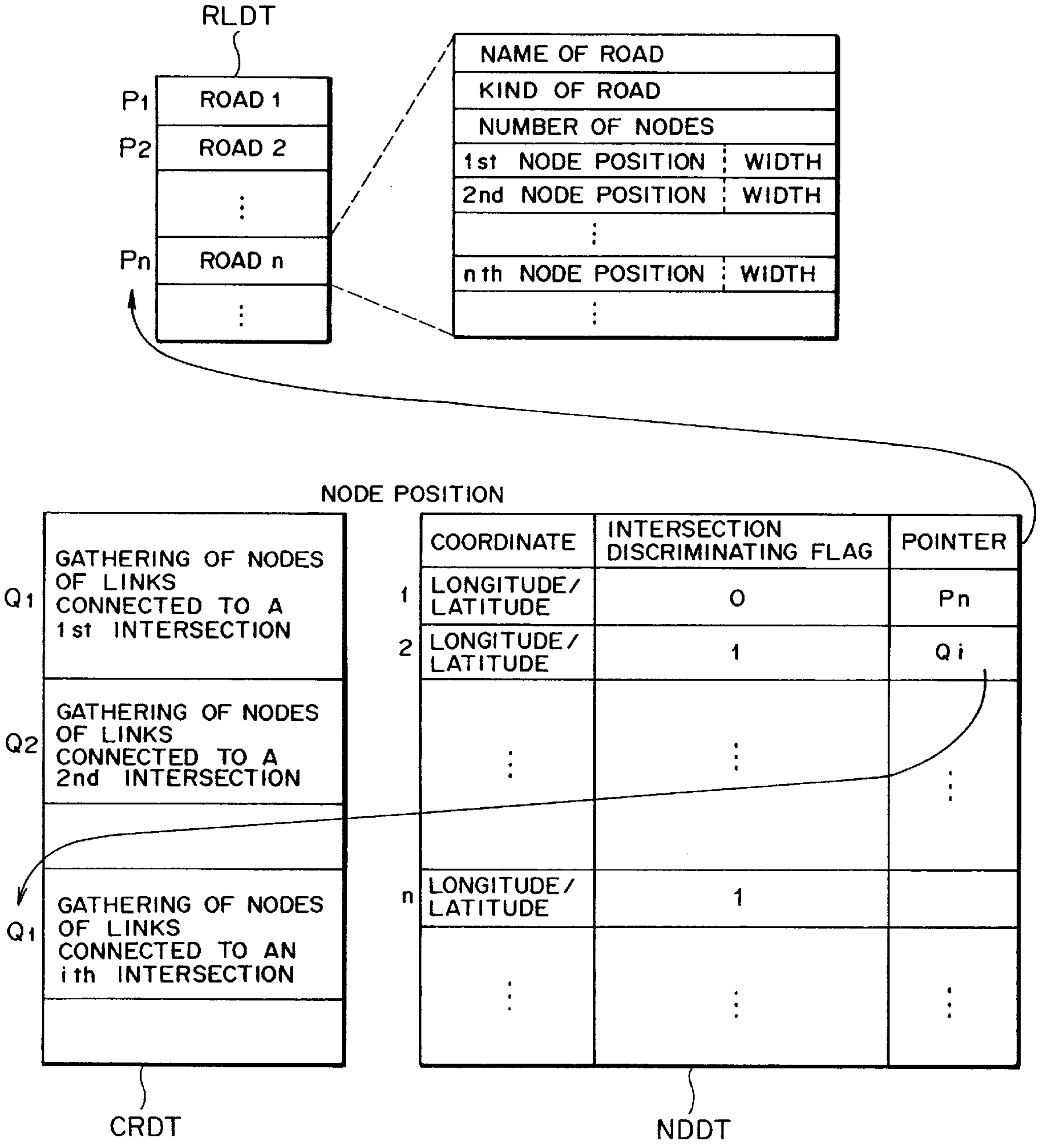
FIG. 2 illustrates road layer information.

FIG. 2 illustrates road layer information of one unit, which has road link data RLDT, node data NDDT, and crossing data CRDT and is used for guide route search processing, map matching processing and the like. The road link data RLDT provides attribute information of the road link and is composed of (1) road numbers of road links (road names), (2) kind of roads (national road, highway road and others), (3) number of all nodes on the road links, and (4) data of position/width of each of the nodes constituting a road link. The crossing data CRDT is a gathering of nodes nearest to the crossing (called a crossing constituent node) of nodes of links connected to the crossing, and the node data NDDT is a list of all nodes constituting roads, and is composed of position information (longitude and latitude) for every node, a crossing discriminating flag identifying whether or not the node is a crossing, and a pointer which points to crossing data if a node is a crossing, and points to a road link to which the node belongs if the node is not a crossing.

Figure 3:
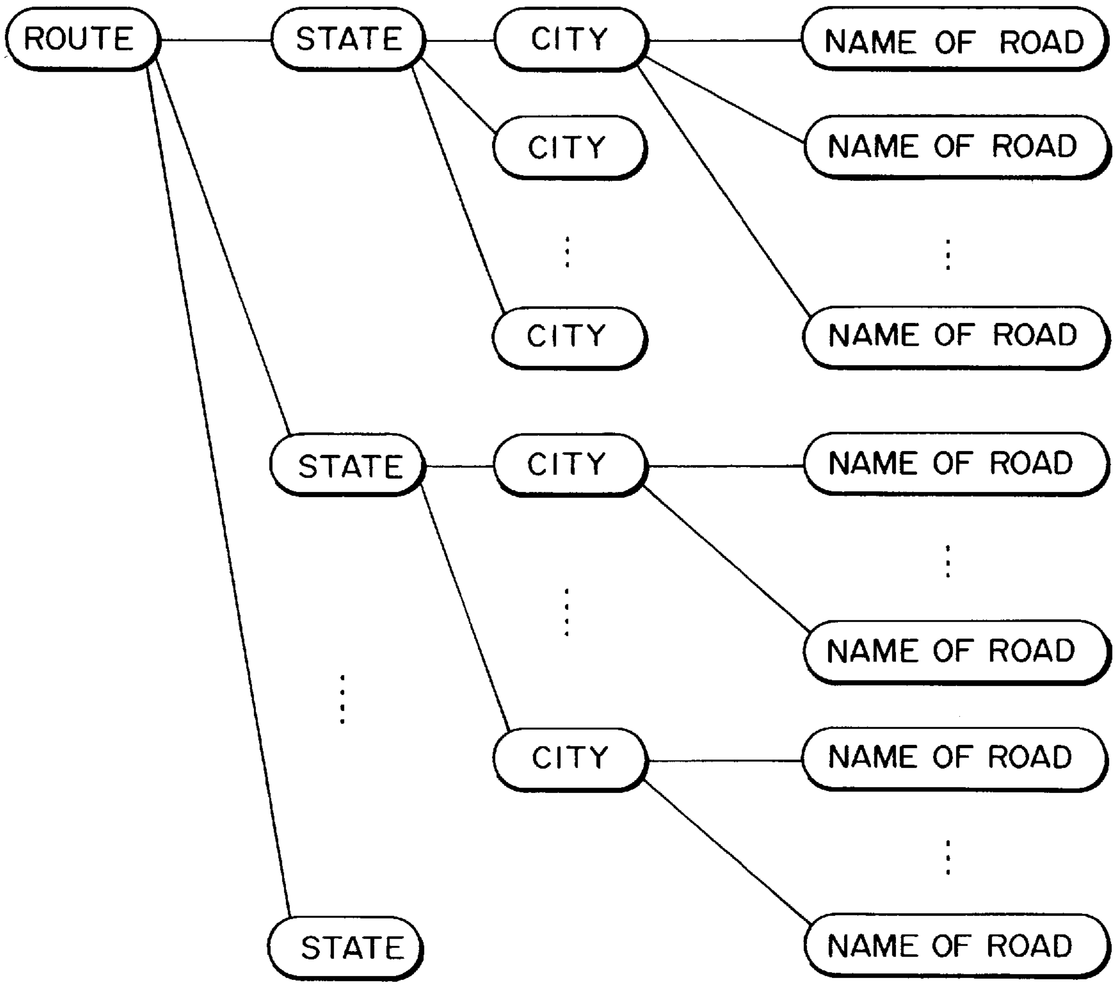
FIG. 3 illustrates a state/city/road name data base.

Returning to FIG. 1, reference numeral 20 designates a vehicle mark generating portion for generating a vehicle mark at a vehicle position on the map, and reference numeral 21 designates a state/city/road name data base memory for storing state/city/road name data base information read out of the map memory medium 10. This data base holds, for every region, for example, the U.S. state, names of all cities belonging to the state, and main roads (such as highways) which are present in each city, as shown in FIG. 3.

Reference numeral 22 designates a difference in time information data base memory for storing the difference in time data base information read out of the map memory medium 10. The difference in time information data base holds the following information for every state, as shown in FIG. 4:

(1) number of time zones to which a state belongs, (2) delay time from the Greenwich standard time (or a relevant time zone), (3) where a state belongs to a plurality of time zones, their delay time (or each relevant time zone name), (4) where a state belongs to a plurality of time zones, boundary information for specifying a state portion belonging to a particular time zone (block longitude and latitude information), (5) information on whether or not daylight saving is enforced, and (6) delay time from the Greenwich standard time of summer time and winter time.

Figure 5A:
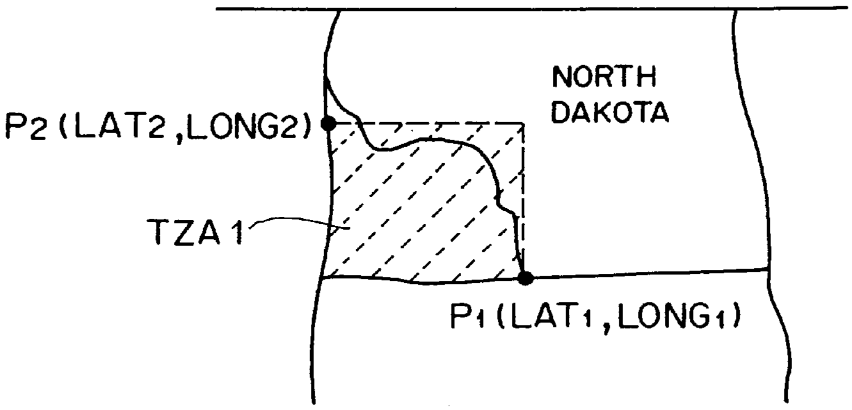
FIGS. 5A and 5B illustrate a method for specifying a state region belonging to a first time zone, where a state belongs to two time zones.
Figure 5B:
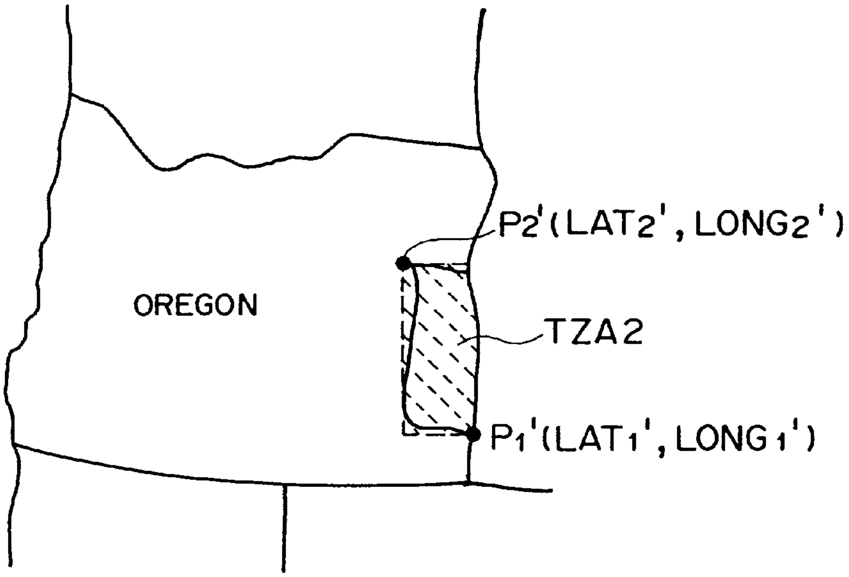

For example, with respect to California, stored are the number of time zones=1, difference in time=−8 hours (8-hour delay), and daylight saving=not enforced. With respect to North Dakota, stored are the number of time zones=2, difference in time in each time zone=−7 hours/−6 hours, boundary information of a region belonging to the time zone with the 7-hour difference in time, and daylight saving=not enforced. The boundary information specifies the boundary of the time zone region TZA1 with a 7-hour difference in time, storing latitudes and longitudes (LAT1, LONG1), (LAT2, LONG2) of two diagonal points $P_1$ and $P_2$ when approximated in a rectangle, as shown in FIG. 5A (oblique lines). With respect to Arizona, stored are the number of time zones=1, difference in time=−7 hours, daylight saving=enforced, difference in time of summer time=−8 hours, and difference in time of winter time=−7 hours. With respect to Oregon, stored are the number of time zones=2, difference in time in each time zone=−8 hours/−7 hours, boundary information of a region belonging to the time zone with 7-hour difference in time, and daylight saving=not enforced. The boundary information specifies the boundary of the time zone region TZA2 with a 7-hour difference in time, storing latitudes and longitudes (LAT1', LONG1'), (LAT2', LONG2') of two diagonal points $P_1'$ and $P_2'$ when approximated in a rectangle, as shown in FIG. 5B (oblique lines).

Reference numeral 23 in FIG. 1 designates a state discrimination portion for detecting the state in which the vehicle is present from a road name RID on which the vehicle is running currently and state/city/road name data base information. Reference numeral 24 designates a difference in time calculating portion for obtaining a difference in time on the basis of the state in which the vehicle is present, difference in time information (FIG. 4), and a vehicle position (longitude and latitude). The difference in time calculating portion 24 operates as follows:

(1) if the state in which the vehicle is present belongs to one time zone, and daylight saving is not enforced, the delay time corresponding to the time zone is output, (2) if the state in which the vehicle is present belongs to one time zone, and daylight saving is enforced, whether the time is displayed on the basis of either summer time or winter time is determined, and the delay time from the standard time in summer time or winter time is output, and (3) if the state in which the vehicle is present belongs to two time zones, the time zone region in which the vehicle is present is determined, and the delay time corresponding to the time zone region where the vehicle is present is output.

In the case of (2) described above, since the summer time start date and time and the winter time start date and time are established by law, the difference in time calculating portion 24 determines whether summer time or winter time is employed in consideration of the date and time established by law and the present date and time to output a difference in time corresponding to summer time or winter time. Further, in the case of (3) described above, because a state portion belonging to the first time zone is approximated by a rectangle, and the latitudes and longitudes at two diagonal points are specified (see FIG. 5), the difference in time calculating portion 24 judges whether or not the vehicle's present position (longitude and latitude) is present within the rectangular region, and if present, outputs the delay time corresponding to the first time zone, while if not present, outputs the delay time corresponding to the second time zone.

The difference in time calculating portion 24 performs, in addition to the above-described difference in time output control in an automatic mode, the difference in time output control in a manual mode. That is, when the time zone and enforcement/unenforcement of daylight saving are specified manually by a remote control 25, this input information is received through a remote control interface 26 to output a specified difference in time.

In FIG. 1, reference numeral 27 designates a time generating portion, which generates the present time on the basis of a difference in time output from the difference in time calculating portion 24. Reference numeral 28 designates a menu image generating portion, which generates a fixed menu image on the basis of the remote control operation. Reference numeral 29 designates a synthesizing portion, which synthesizes a map image, a vehicle mark, time and a menu image to input them into the display unit 16 for displaying on the screen.

Figure 6:
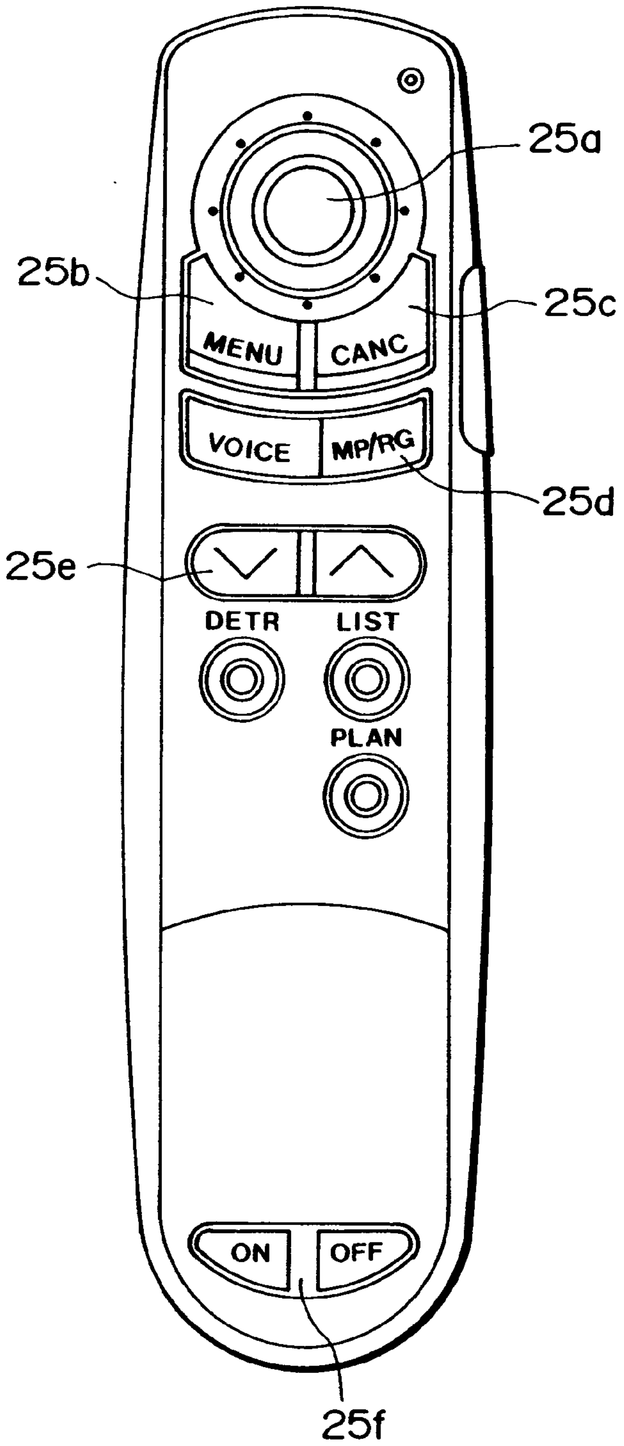
FIG. 6 is an external view of a remote control unit.

FIG. 6 is an external view of a remote control unit, which has a joystick/enter key 25*a*, a menu key 25*b*, a cancel key 25*c*, a MP/RG key 25*d*, a zoom/scroll key 25*e*, a monitor on/off key 25*f*, etc. The joystick/enter key 25*a* has a function as a joystick key for relatively moving a cursor or a vehicle mark with respect to a map in eight directions, or moving a menu bar (highlight position) when the desired menu item is selected, and a function as an enter key for setting and inputting a cursor position and selecting and inputting a menu. The menu key 25*b* is operated when a main menu is displayed, and the cancel key 25*c* is operated when the present display screen is cancelled and is returned to the previous screen of the menu. The MP/RG key 25*d* is operated when a guide mode (MAP GUIDE MODE and ARROW GUIDE MODE) is switched, and the zoom/scroll key 25*e* is operated when an up/down shift of a highlight position or an enlargement/contraction of a map and various lists is carried out.

Figure 7A:
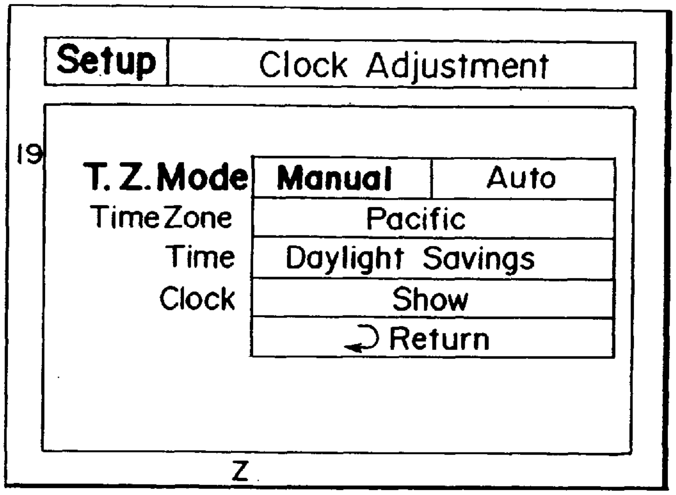
FIGS. 7A–7C illustrate an operation for manual setting.
Figure 7B:
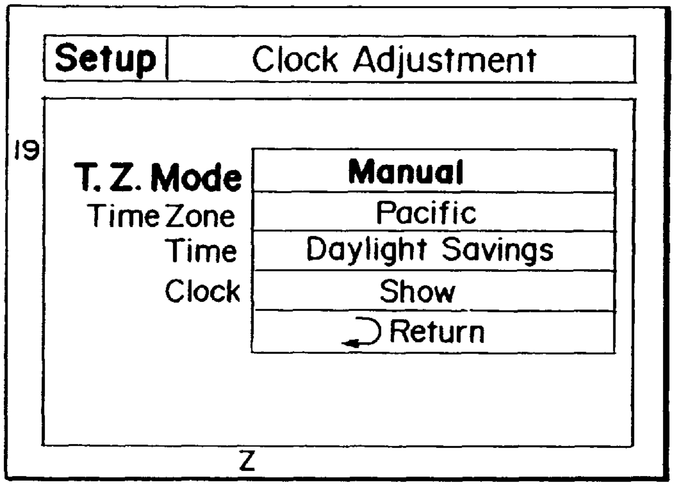
Figure 7C:
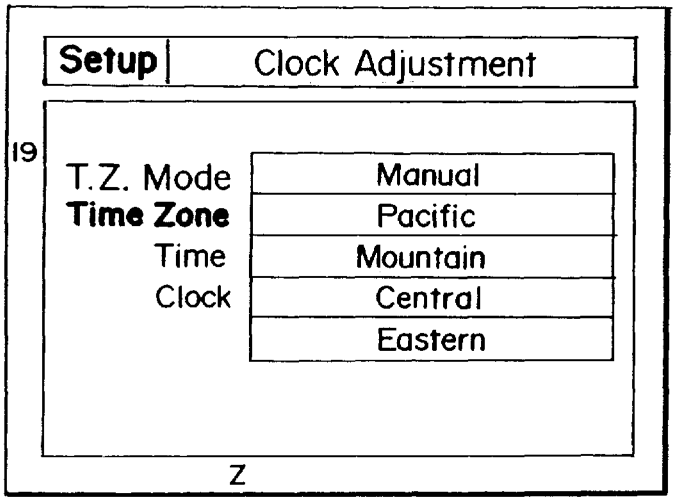

For setting a time zone, and enforcement/unenforcement of daylight saving in a manual mode, the menu key 25*b* of the remote control unit 25 is operated to indicate a Clock Adjustment image in the Setup menu shown in FIG. 7A. When in this image "T.Z. mode" is indicated to select "Manual", a manual setting image as shown in FIG. 7B appears. It is noted that "Auto" can be also selected. In the image of FIG. 7B, when "Time Zone" is indicated, the time zone selecting image of FIG. 7C is displayed, and a fixed time zone is selected. The image is returned to the image of FIG. 7B by selecting the time zone. However, the selected time zone is displayed on the time zone column. In the image of FIG. 7B, when "Time" is indicated, a Daylight Savings setting image (not shown) is displayed, and enforcement/unenforcement of Daylight Savings is set. Thereafter, similarly, "Clock" can be selected to set a clock display/undisplay.

Figure 8:
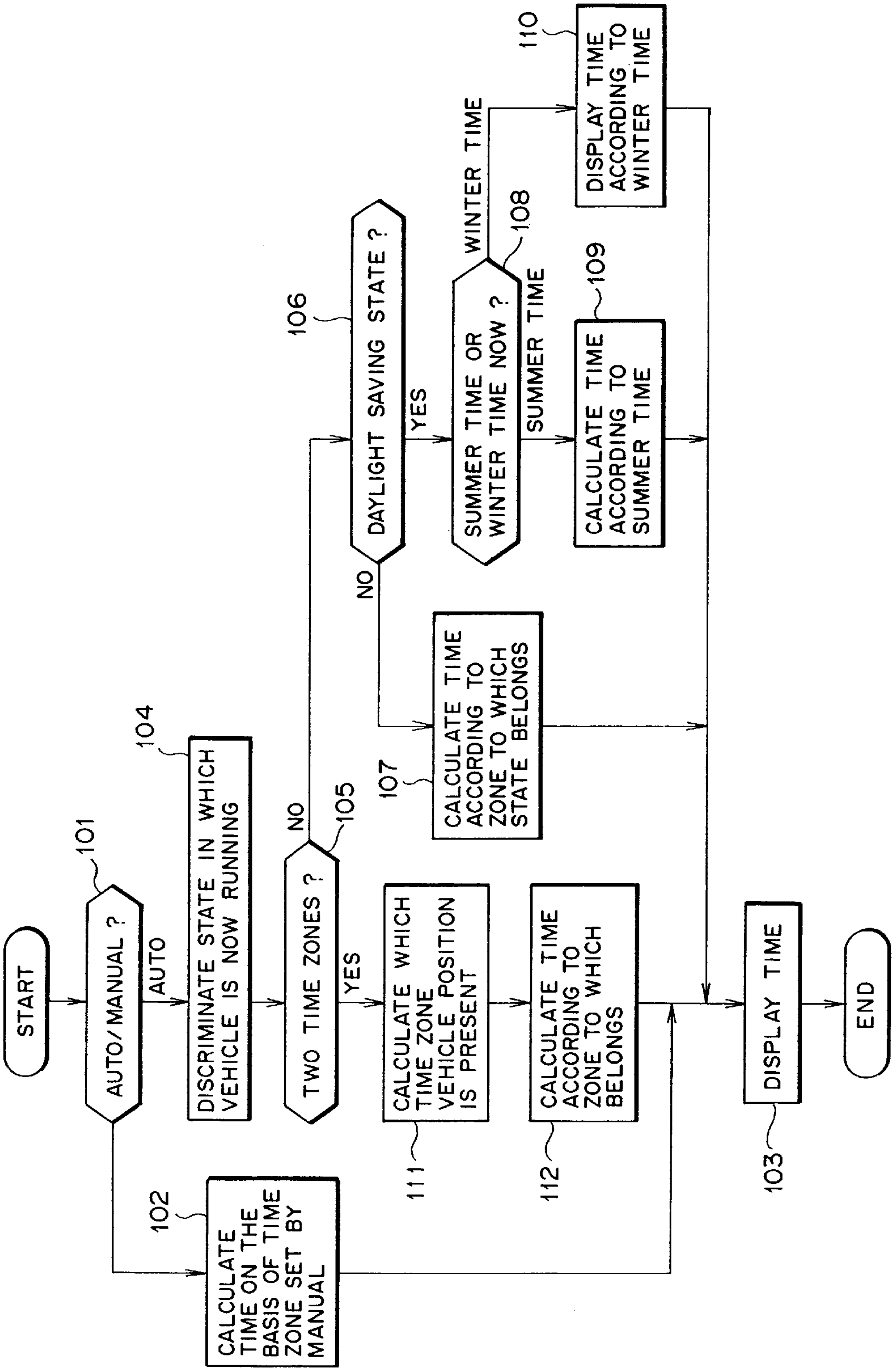
FIG. 8 is a flowchart of a time display process according to the present invention.
Figure 9:
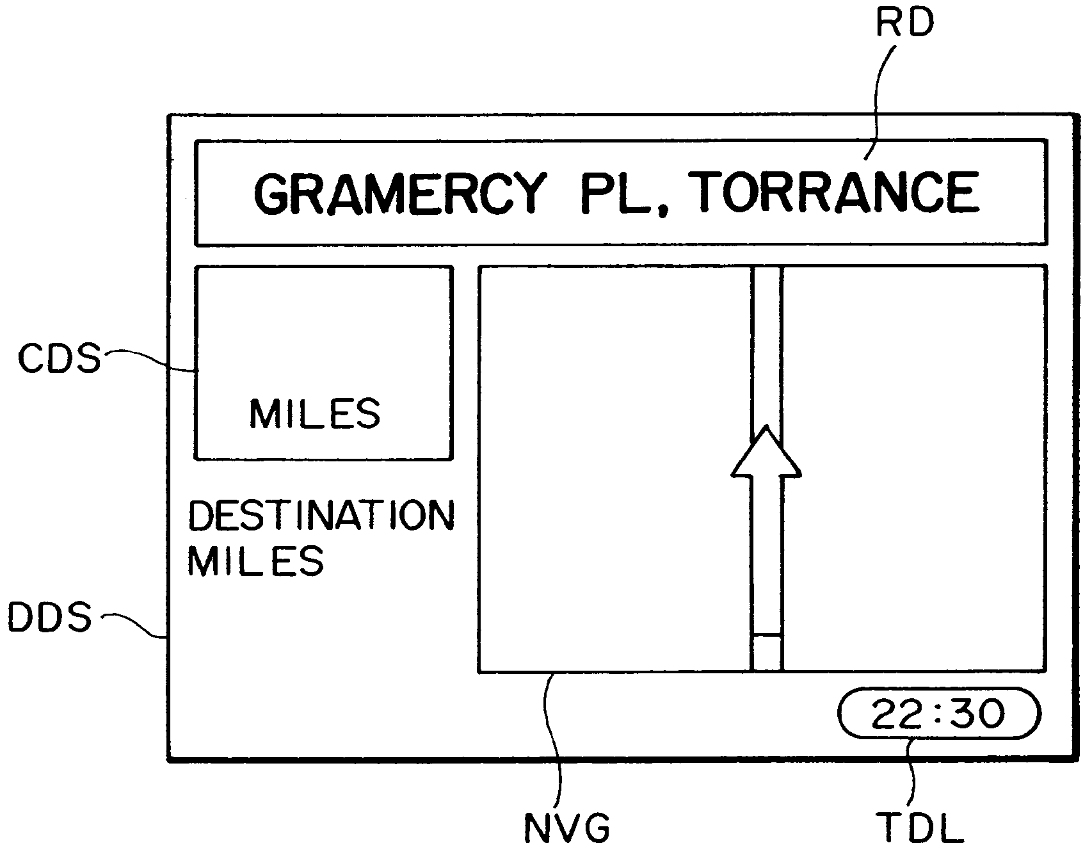
FIG. 9 is an example of a display including time for a navigation apparatus.
Figure 10:
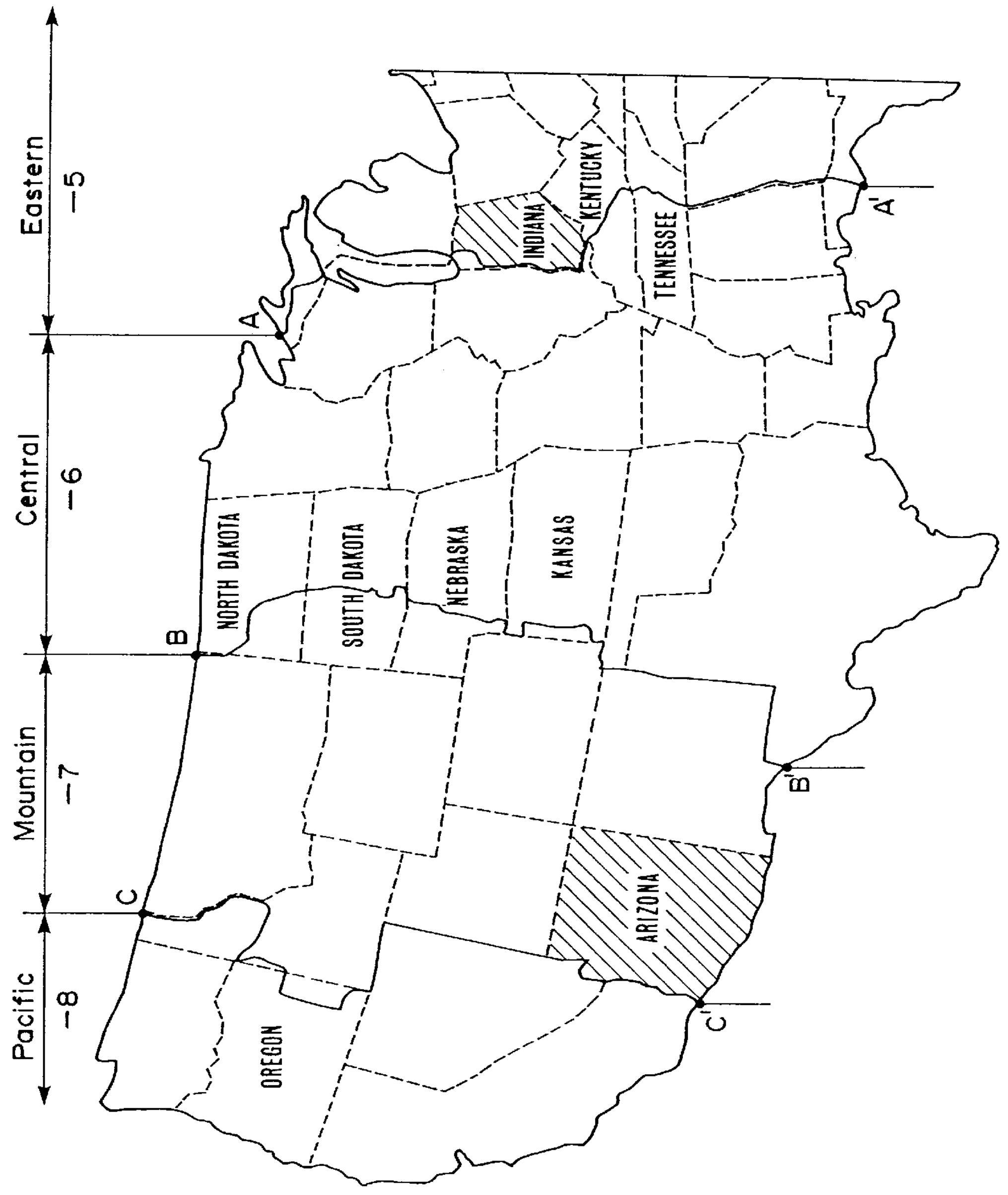
PRIOR ART FIG. 10
FIG. 10 illustrates time zones in the U.S. mainland, as is known in the art.

FIG. 8 shows a flowchart of the time display method of the present invention, and FIG. 9 shows a map display example including the time display. First, the remote control unit 25 is operated to set the time display mode to either manual or auto (Step 101). If it is a manual mode, the difference in time calculating portion 24 obtains a difference in time on the basis of the time zone and the enforcement/unenforcement of daylight saving as set manually, and the time generating portion 27 calculates the present time TDL on the basis of the difference in time (Step 102) to display the present time on the screen of the display unit 16 as shown in FIG. 9 (Step 103). In FIG. 9, CDS is a portion for displaying a distance (miles) to an intersection, DDS is a portion for displaying a distance (miles) to a destination, NVG is a guide image for showing the vehicle running direction, RD is a name display portion identifying the road on which vehicle is currently running, and TDL is a present time display portion.

If the auto mode is set in Step 101, the state discrimination portion 23 discriminates the state in which the vehicle is currently present using the name of road on which the vehicle is currently running and the state/city/road name data base (Step 104). Then, the difference in time calculating portion 24 refers to the difference in time information data base to check whether or not two time zones are present in the state (Step 105). If only one is present, the difference in time calculating portion 24 refers to the difference in time data base to judge whether the state is enforcing or not enforcing daylight saving (Step 106). If the state in which the vehicle is present is a state not enforcing daylight saving, the difference in time calculating portion 24 obtains a difference in time from the Greenwich standard time for the state from the difference in time information data base 22; the time generating portion 27 calculates the present time on the basis of the difference in time thus obtained, (Step 107); and the present time is displayed on the screen (Step 103).

In Step 106, if the state in which the vehicle is present enforces daylight saving, the difference in time calculating portion 24 decides whether summer time or winter time is employed in consideration of the present date and time, the summer time start date and time, and the winter time start date and time (Step 108). If it is summer time, the difference in time calculating portion 24 outputs a difference in time corresponding to the summer time, and the time generating portion 27 calculates the present time on the basis of this difference in time (Step 109). If it is winter time, the difference in time calculating portion 24 outputs a difference in time corresponding to the winter time, and the time generating portion 27 calculates the present time on the basis of this difference in time (Step 110) to display the present time on the screen (Step 103).

On the other hand, in Step 105, when two time zones are present in the state in which the vehicle is present, the difference in time calculating portion 24 judges whether the vehicle's present position (longitude and latitude) is present in the state portion of the first time zone specified by boundary information from the difference in time data base (Step 111), and if it is present, outputting a difference in time corresponding to the first time zone, while if it is not present, outputting a difference in time corresponding to the second time zone. The time generating portion 27 calculates the present time on the basis of this difference in time (Step 112) to display the present time on the screen (Step 103).

As described above, according to the present invention, the boundary line of the time zone need not be specified geographically, but the time zone can be discriminated by simple processing to display the present time.

Further, according to the present invention, if the state belongs to two time zones, the state portion belonging to one time zone is approximated by a rectangle, and it is possible to easily judge whether or not the vehicle is present within the state portion, and to recognize if the present time is to be displayed in accordance with the one time zone to properly display the present time.

Furthermore, according to the present invention, because the time zones and the enforcement/unenforcement of daylight saving are recognized for every state, the state in which the vehicle is present is detected so that the time display can be made by simple processing in consideration of the time zone and daylight saving.

While in the foregoing a case has been described in which the present invention is applied to the U.S. mainland, it is to be noted that the applied region is not limited to the U.S. mainland.

As many apparently widely different embodiments of the present invention can be made without departing from the spirit and scope thereof, it is to be understood that the invention is not limited to the specific embodiments thereof except as defined in the appended claims.

What is claimed is:

1. A time display method for displaying the present time in a vehicle in consideration of a delay time from a standard time, the method comprising:

storing a delay time from the standard time for each of a plurality of geographic regions, and, where a region includes a plurality of time zones, storing respective delay times and boundary information for specifying a region portion associated with each time zone;

monitoring the present position of the vehicle and detecting a region in which the vehicle is present;

where the region in which the vehicle is present is associated with only one time zone, as determined by referring to said stored information, providing a time display on the basis of the delay time corresponding to the time zone associated with the region in which the vehicle is present; and where the region in which the vehicle is present is associated with a plurality of time zones, determining the region portion in which the vehicle is present on the basis of said boundary information and said vehicle present position, and providing a time display on the basis of the delay time corresponding to the time zone associated with the region portion in which the vehicle is present.

2. The time display method according to claim 1, wherein said region portion is approximated by a rectangle, and the boundary of the region portion is defined by longitudes and latitudes of two diagonal points of said rectangle.

3. The time display method according to claim 1, provided with a data base storing, for every region, names of cities belonging to said region, and roads present in the cities, comprising;

determining the name of the road on which the vehicle is running at present; and determining the region in which the vehicle is present by referring to said data base.

4. The time display method according to claim 3, wherein a navigation function for guiding the vehicle to a destination is provided on the vehicle, so that the name of the road on which the vehicle is running at present is obtained using map information for navigation.

5. The time display method according to claim 1, further comprising:

storing information identifying whether or not daylight saving is enforced for every region;

determining whether or not the region in which the vehicle is present is enforcing daylight saving by referring to said stored information;

if said region is not enforcing daylight saving, providing a time display on the basis of the delay time corresponding to the time zone of said region; and if said region is enforcing daylight saving, judging whether the time display is to be made on the basis of either summer time or winter time and providing a time display on the basis of the delay time from the standard time in summer time or winter time of said region.

6. The time display method according to claim 1, wherein said region is a state.

7. A time display apparatus for displaying the present time in a vehicle in consideration of a delay time from a standard time, the apparatus comprising:

a memory for storing a delay time from the standard time or a time zone name for each of a plurality of geographic regions in which the vehicle may travel, and, where a region includes a plurality of time zones, storing respective delay times or respective time zone names and boundary information for specifying a region portion associated with each time zone;

means for monitoring the present position of the vehicle;

means for detecting a region in which a vehicle is present;

means for calculating a present time, which, if the region in which the vehicle is present is associated with only one time zone, calculates the present time on the basis of the delay time corresponding to said one time zone, and if the region in which the vehicle is present is associated with a plurality of time zones, calculates the present time on the basis of the delay time corresponding to the time zone associated with the region portion in which the vehicle is present; and a display portion for displaying the calculated present time.

8. The time display apparatus according to claim 7, wherein said region portion is approximated by a rectangle, and said boundary information for the region portion comprises longitudes and latitudes of two diagonal points of said rectangle.

9. The time display apparatus according to claim 7, wherein said means for calculating a present time determines a region portion in which the vehicle is present on the basis of the boundary information and the present vehicle position, and calculates the present time on the basis of the delay time corresponding to said region portion.

10. The time display apparatus according to claim 7, wherein said means for detecting a region in which the vehicle is present comprises:

a data base for storing, for every region, names of cities belonging to said region, and roads present in said cities; and means for obtaining the name of the road on which the vehicle currently is running, thereby determining the region in which the vehicle is present from the name of the current road and said data base.

11. The time display apparatus according to claim 10, wherein said means for obtaining the current road determines the name of the current road using map information for navigation guidance and the present vehicle position information.

12. The time display apparatus according to claim 7, wherein said memory stores information on whether or not daylight saving is enforced for every region, and said means for calculating a present time, by referring to said stored information, if said region does not enforce daylight saving, calculates the present time on the basis of the delay time corresponding to the time zone of said region, and if said region enforces daylight saving, calculates the present time on the basis of the delay time from the standard time in either summer time or winter time.

13. The time display apparatus according to claim 12, comprising means for setting manually a time zone for a time display, and setting manually whether or not time is to be displayed on the basis of daylight saving, wherein said means for calculating a present time calculates the present time on the basis of the information entered manually.

* * * * *